US011093488B1

(12) United States Patent
Perkins et al.

(10) Patent No.: US 11,093,488 B1
(45) Date of Patent: Aug. 17, 2021

(54) NATURAL LANGUAGE SEARCH WITH SEMANTIC MAPPING AND CLASSIFICATION

(71) Applicant: Insight Engines, Inc., San Francisco, CA (US)

(72) Inventors: Jacob A. Perkins, Los Gatos, CA (US); Grant M. Wernick, Los Gatos, CA (US); Arnold M. Wernick, Los Gatos, CA (US)

(73) Assignee: Insight Engines, Inc., San Francisco, CA (US)

( * ) Notice: Subject to any disclaimer, the term of this patent is extended or adjusted under 35 U.S.C. 154(b) by 21 days.

(21) Appl. No.: 16/752,348

(22) Filed: Jan. 24, 2020

Related U.S. Application Data

(63) Continuation of application No. 15/147,113, filed on May 5, 2016, now Pat. No. 10,545,956.

(60) Provisional application No. 62/171,971, filed on Jun. 5, 2015.

(51) Int. Cl.
| | |
|---|---|
| *G06F 16/00* | (2019.01) |
| *G06F 16/242* | (2019.01) |
| *G06F 16/9535* | (2019.01) |
| *G06F 16/31* | (2019.01) |
| *G06F 40/30* | (2020.01) |
| *G06F 16/33* | (2019.01) |
| *G06F 40/35* | (2020.01) |
| *G06F 16/332* | (2019.01) |

(52) U.S. Cl.
CPC ............ *G06F 16/243* (2019.01); *G06F 16/31* (2019.01); *G06F 16/334* (2019.01); *G06F 16/3329* (2019.01); *G06F 16/9535* (2019.01); *G06F 40/30* (2020.01); *G06F 40/35* (2020.01)

(58) Field of Classification Search
USPC ......................................................... 707/706
See application file for complete search history.

(56) References Cited

U.S. PATENT DOCUMENTS

2008/0052078 A1\* 2/2008 Bennett ................... G09B 7/02
704/257

\* cited by examiner

*Primary Examiner* — Thu Nguyet T Le
(74) *Attorney, Agent, or Firm* — Haynes Beffel & Wolfeld LLP; Ernest J. Beffel, Jr.

(57) ABSTRACT

The usefulness of a search engine depends on the relevance of the result set it returns. Search problems in a particular domain require an understanding of the user's intent that traditional search methods lack, including a sense of time, domain and situational context, user preferences and the history of previous searches in the domain of interest. In an age in which speaking to technology is becoming the norm and user expectations are skyrocketing, semantic search is more important than ever. The disclosed technology describes systems and methods for implementing natural language search with semantic mapping and classification. The technology further discloses systems and methods for including social search, making it possible for users to include input from friends in search results. The disclosed technology offers a customizable flexible technology designed to be taught about a domain and to be able to systematically adapt to its unique needs.

27 Claims, 16 Drawing Sheets

Workflow

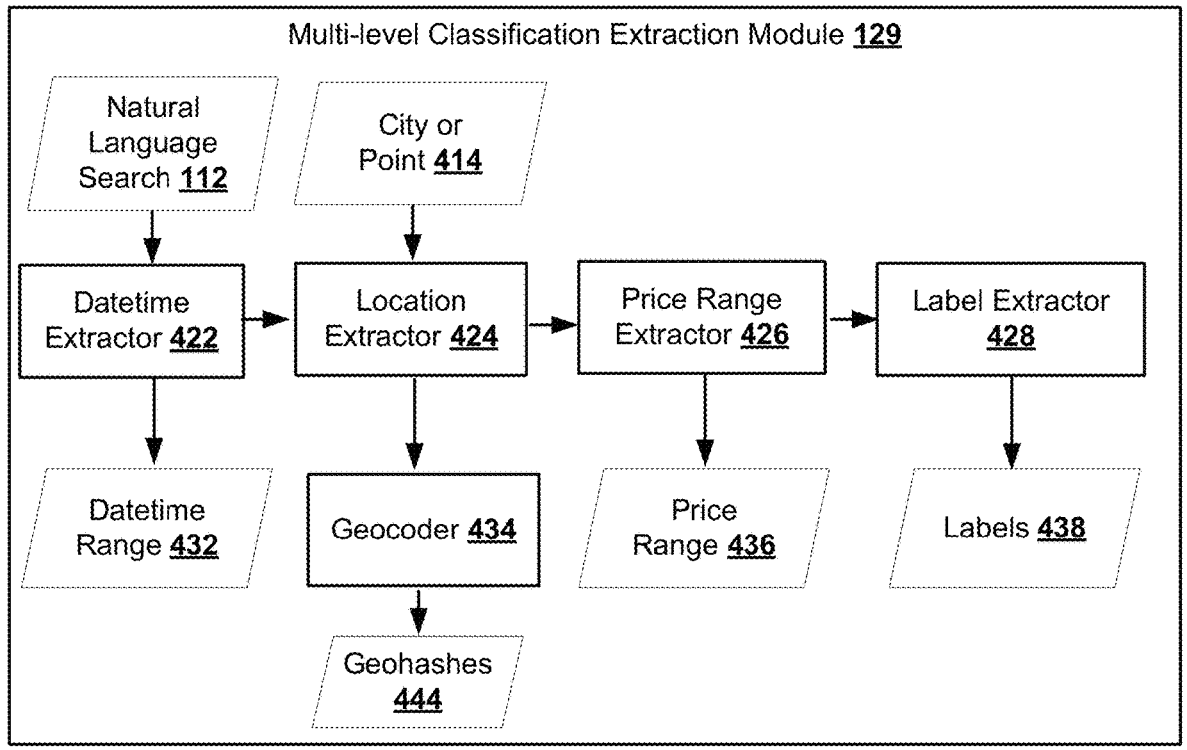
Fig. 4A Example for Local Search
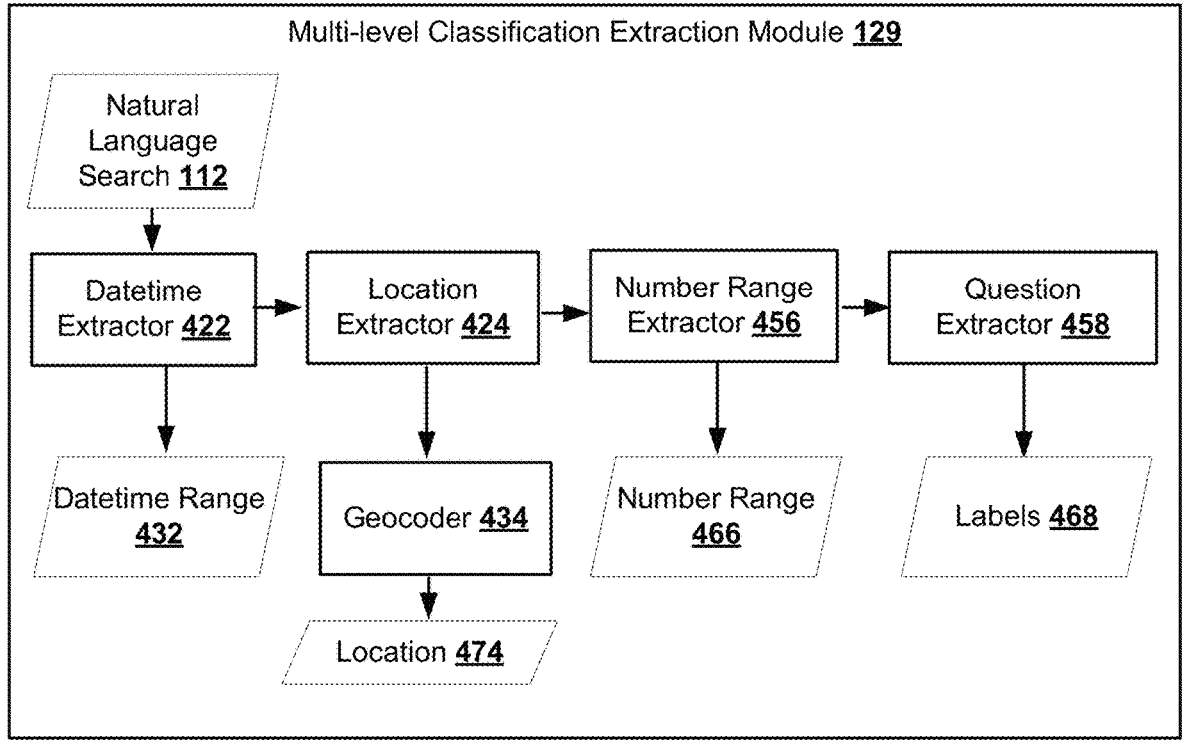
Fig. 4B Example for Data Security System

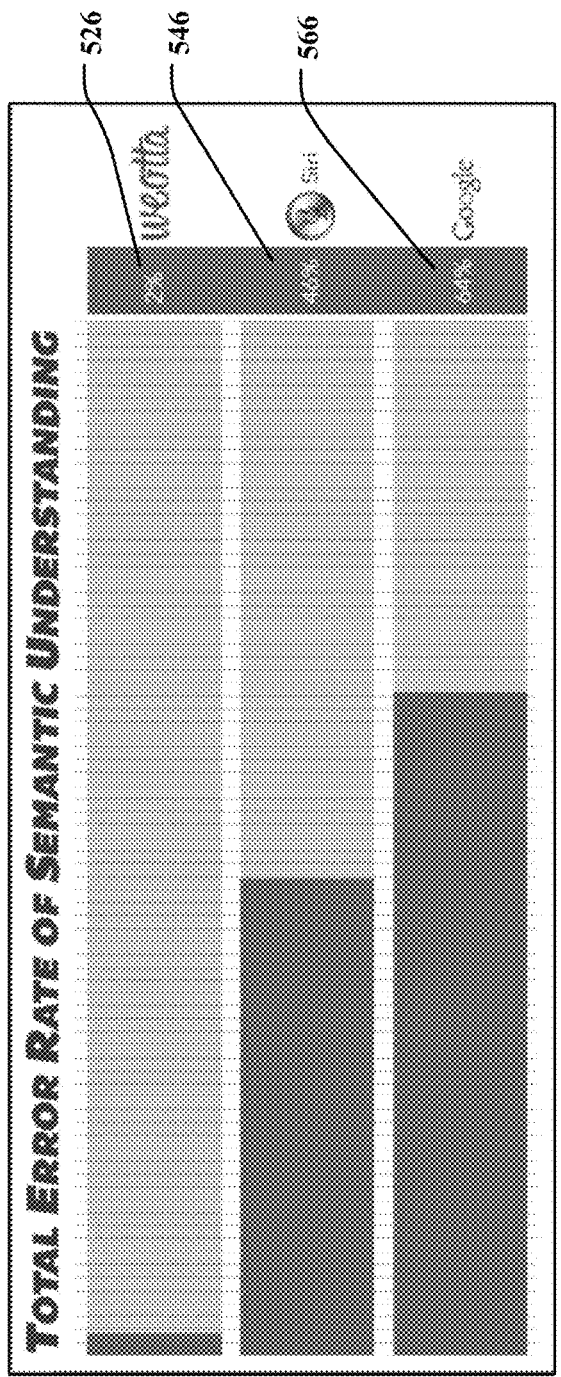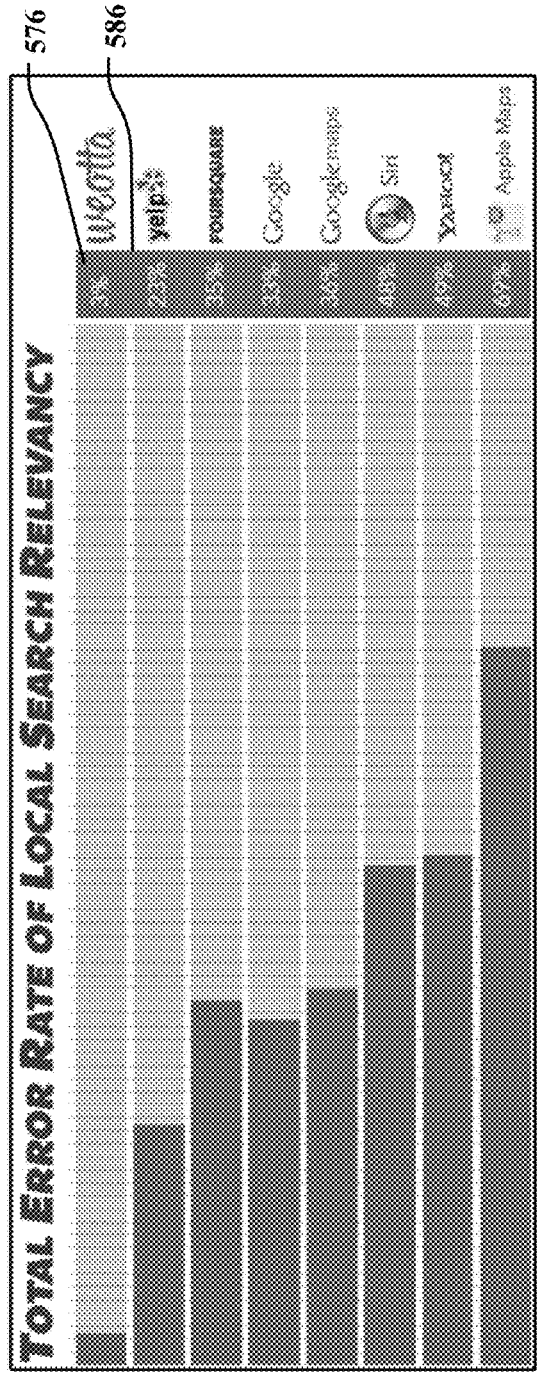
Fig. 5A Outcome of Semantic Understanding Study, October 2014
Fig. 5B Outcome of Local Search Relevancy Study, October 2014

Fig. 6A Dynamic Re-Ranking - Local Search Use Case Example
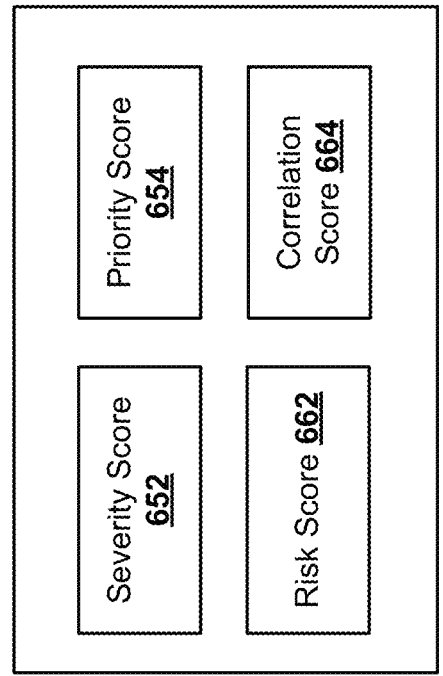
Fig. 6B Dynamic Re-Ranking - Security Use Case Example classy italian San Francisco, CA

Selector 1 radius: ... vert: ... subject: Food label_counts.classy: ... where: ... until: ... type: ...
maybe_feats: ...

| Score | Weight | Distance | Title | Subject | Type | City |
|---|---|---|---|---|---|---|
| 190.00 | 53.63 | | Acquerello | Food | American, American (New), European, Italian, Lounge | San Francisco |
| 195.00 | 03.16 | | Gioradano | Food | American, American (New), Californian, Italian, Mediterranean, Organic | San Francisco |
| 193.00 | 43.93 | | Sociale | Food | Italian | San Francisco |
| 208.00 | 43.90 | | Acquerello | Food | Italian | San Francisco |
| 199.00 | 33.70 | | CHARDONNAY | Food | Continental, European, Italian | San Francisco |
| 199.00 | 33.94 | | Original Joes | Food | American, Italian, Sandwiches, Steakhouses | San Francisco |
| 193.00 | 33.18 | | Zuni Cafe | Food | American, American (New), Californian, European, French, Italian, Mediterranean, Organic, Soup & Salad | San Francisco |
| 191.75 | 03.25 | | Blondies | Food | European, Italian | San Francisco |

```
def disambiguate_query(q, best=True, f_select_term_buckets=select_term_buckets,
f_select_bucket_mapping=select_bucket_mapping):
    words = tokenize_string(q)    ⌒— 922
    grams = generate_ngrams(words, min(MAX_NGRAM, len(words)))
    if not grams: return {}, []
    exgrams = expanded_word_form_ngrams(grams)    ⌒— 932 if q not in exgrams:
        exgrams.add(q)
        exgrams |= word_forms(q)
                                                  ⌒— 942
    bucket_terms = f_select_term_buckets(exgrams)
    ns_grams = set(no_stopwords_grams(q, exgrams, bucket_terms))
    # maybe do a 2nd pass to get mappings from ngrams without stopwords
    if ns_grams:
        grams.extend(ns_grams)
        ns_bt = f_select_term_buckets(ns_grams)
        bucket_terms.extend(ns_bt)

# keep unknown unigrams & bigrams
    unknown = set([g for g in grams if g.count(' ') < 2])
    # remove all known terms & ngrams of known terms
    unknown -= set(bucket_term_ngrams(bucket_terms))
    expanded = expand_word_forms(unknown) - unknown
    # retry unknown unigrams & bigrams with different word forms
    if expanded:
        ex_bt = f_select_term_buckets(list(expanded))
        bucket_terms.extend(ex_bt)
        logger.debug('expanded bucket terms %s' % (ex_bt,))
        unknown -= set([tup[1] for tup in ex_bt])

terms, term_buckets, term_statuses = [], collections.defaultdict(set), collections.defaultdict(dict)
    uc_terms = []
    for tup in bucket_terms:
        b, t = tup[0:2]
        st = tup[-1] if len(tup) > 2 else None
        # can have multiple buckets for a term, but only want to choose
        # best terms from a unique list
        if t not in term_buckets and b.lower() not in ['uc']:
            terms.append(t)
        term_buckets[t].add(b.lower())
        term_statuses[t][b] = st
    terms = [try_utf8(t) for t in terms]
```

Fig. 9 Disambiguate Query part 1 of 2

```
if best and terms:
        # NOTE: terms are sorted by index in grams so that original terms are
        # favored over expanded word forms
        n = len(words)
        terms.sort(key=lambda t: grams.index(t) if t in grams else n)
        best_terms = choose_best_ngrams(terms)
elif terms:
        best_terms = [t for t in terms if isinstance(t, basestring) or len(t) < 3]
else:
        best_terms = term_buckets.keys()

# {term: {buck_id: mapping}}
term_rules = {t: {b: f_select_bucket_mapping(b, t) for b in term_buckets[t]} for t in best_terms}
conjoin_rules(words, term_rules)
for_with_rules(words, term_rules)
unknown -= CONJUNCTIONS | FOR_WITH_WORDS | set(best_terms)

if unknown: unknown -= expanded_word_form_ngrams(best_terms)
if unknown: unknown -= expanded_word_form_ngrams(itertools.chain(*[t.split(u' ') for t in best_terms if u' ' in t]))

for term, bm in term_rules.iteritems():
        if 'uc' in bm and len(bm) > 1:
                del bm['uc']

if unknown:
        buckets = set(itertools.chain(*[bm.keys() for bm in term_rules.itervalues()]))

if buckets <= set(TEXT_BUCKETS):
                term_rules.update({t: {'tx': [], 'uc': []} for t in unknown})
                        else:
                term_rules.update({word: {'uc': []} for word in unknown})

return term_rules, grams      —— 1082
```

Fig. 10 Disambiguate Query part 2 of 2

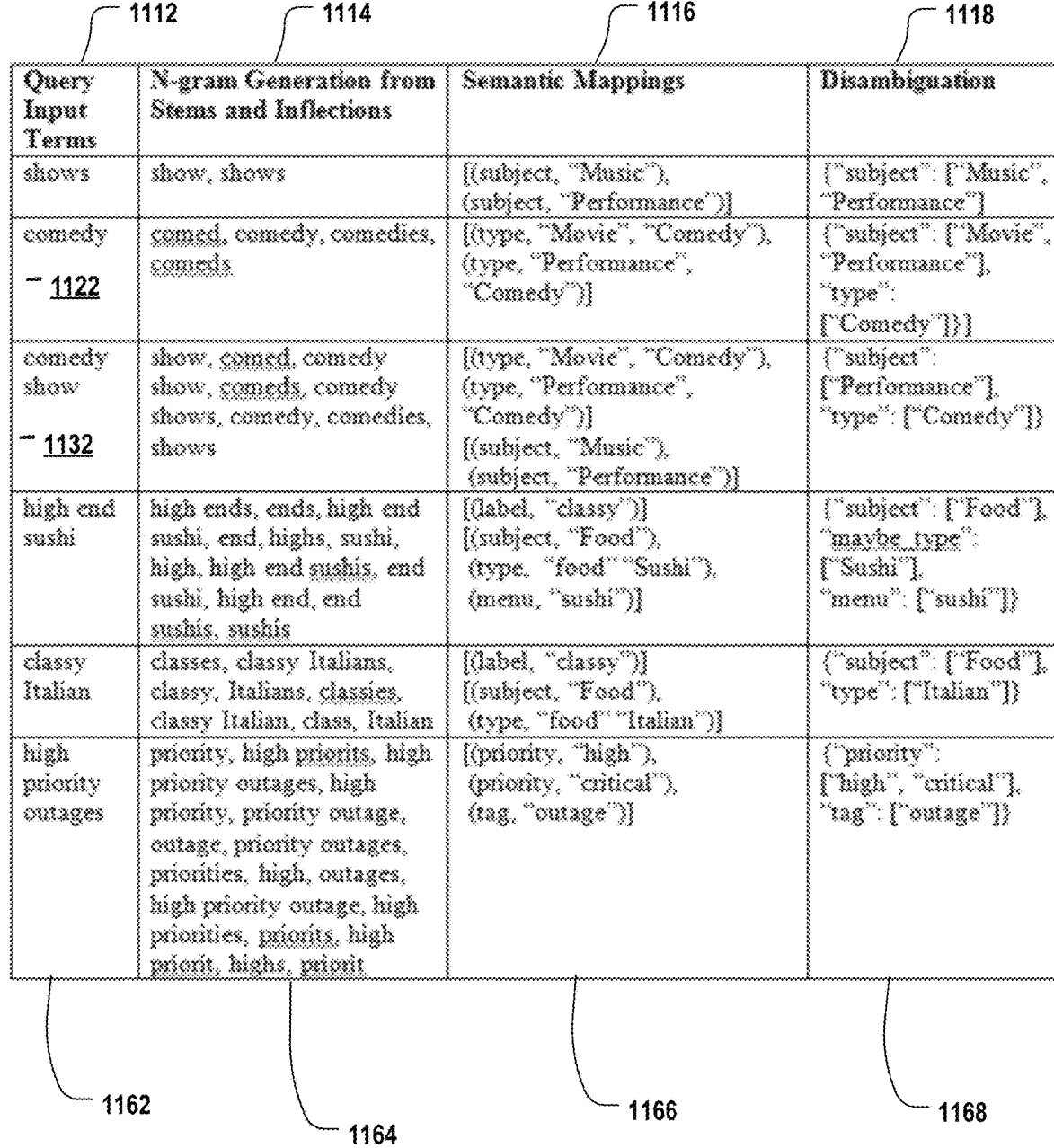
Fig. 11 Example Data Structures for Semantic Disambiguation

┌─ 1212

```
def for_with_rules(words, term_rules):
    '''
    >>> term_rules = {'bars': {'su': [('drink',)]}, 'with': {'st': []}, 'food': {'su': [('food',)]}, 'fe': [('food',)]}}
    >>> for_with_rules(['bars', 'with', 'food'], term_rules)
    >>> term_rules
    {'food': {'fe': [('food',)], 'su': [('food',)]}, 'bars': {'su': [('drink',)]}, 'with': {'with': ['food', 'foods']}}
    ''' for_with_words = []
    tagged_words = tagging.tag(words)
    prev_words = []

for i, (word, tag) in enumerate(tagged_words):
        if i and tag.startswith('HV') and tagged_words[i-1][1].startswith('WP'):
            pass
        elif tag != 'IN' or word not in FOR_WITH_WORDS:
            if not for_with_words: prev_words.append(word)
            continue terms = words[i+1:]
        if not terms: continue
        grams = expanded_word_form_ngrams(generate_ngrams(terms, min(MAX_NGRAM, len(terms))))
        for_with_words.extend([g for g in grams if is_term_mapped(g, term_rules)])

if not for_with_words: return
        prev_mapping_keys = set()

if prev_words:
        for gram in expanded_word_form_ngrams(generate_ngrams(prev_words, min(MAX_NGRAM, len(prev_words)))):
            prev_mapping_keys |= set(term_rules.get(gram, {}).keys())

if not set(['su', 'ty']).isdisjoint(prev_mapping_keys):
        term_rules['with'] = {'with': for_with_words}
```

Fig. 12 for_with_Rules Code Example

```
                            ┌─ 1314
                           ∫ def conjoin_rules(words, term_rules):
        i, joinsets = 1, []

for i, word in enumerate(words[1:len(words)-1]):
        if word not in CONJUNCTIONS: continue
        # there could be multiple conjunctions in sequence, so we need to skip over them
        w = i
        while w and words[w] in CONJUNCTIONS: w -= 1
        w1 = words[w]

w = i+2
        while w < len(words) - 1 and words[w] in CONJUNCTIONS: w += 1
        w2 = words[w]

if w1 in CONJUNCTIONS or w2 in CONJUNCTIONS: continue
        joinsets.append(set([w1, w2]))

if not joinsets: return
    i = 0
    # now union all intersecting sets
    while i < (len(joinsets) - 1):
        js1, js2 = joinsets[i], joinsets[i+1]

if js1.isdisjoint(js2):
            i += 1
            continue joinsets[i] |= js2
        del joinsets[i+1]
    # before setting join rule, remove all existing conjunction terms
    for word in CONJUNCTIONS:
        if word in term_rules:
            del term_rules[word]

if joinsets:
        term_rules['&'] = {'join': joinsets}
```

Fig. 13 conjoin_rules Code Example

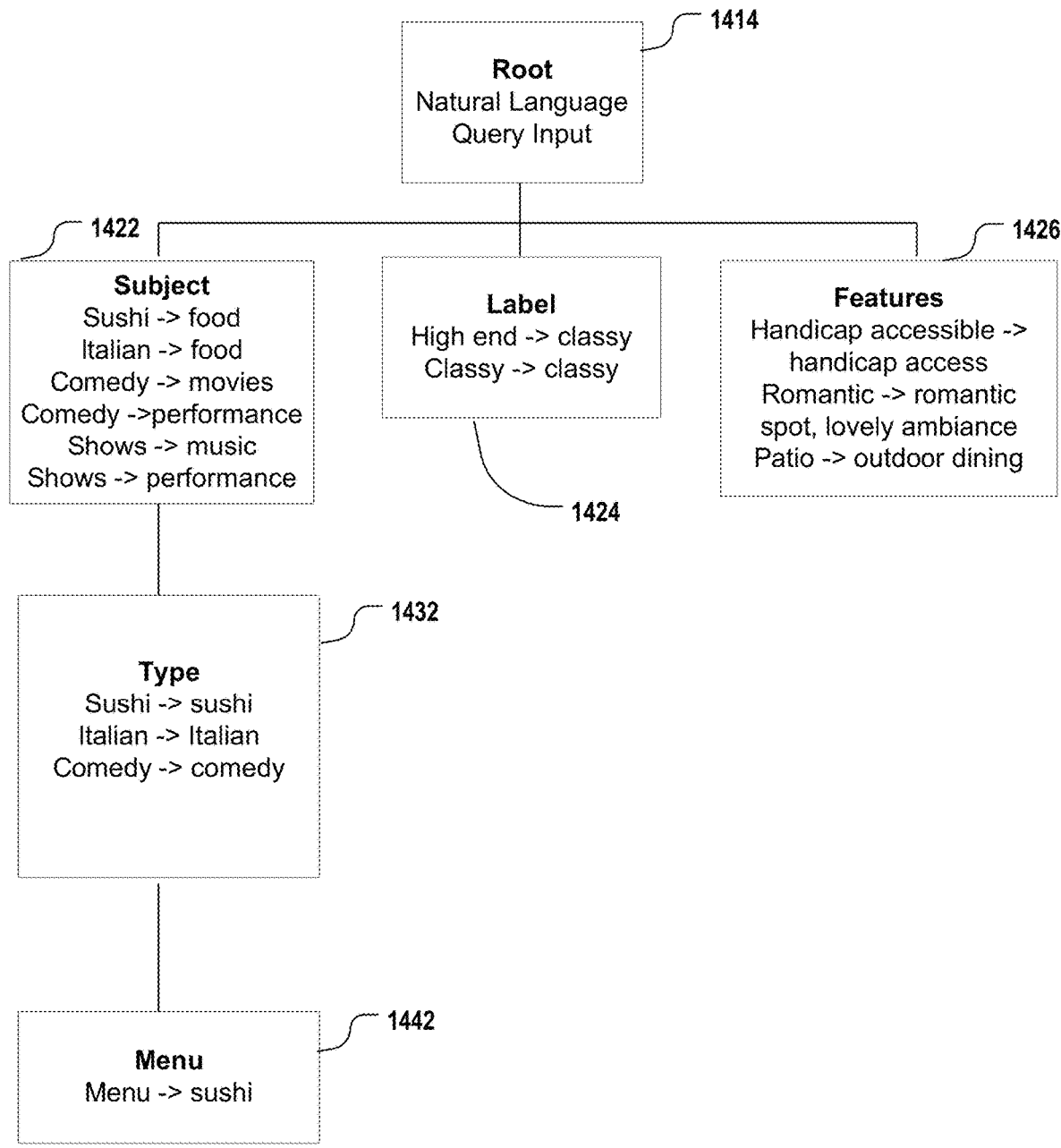
FIG. 14 Multi-level Hierarchical Structure Example

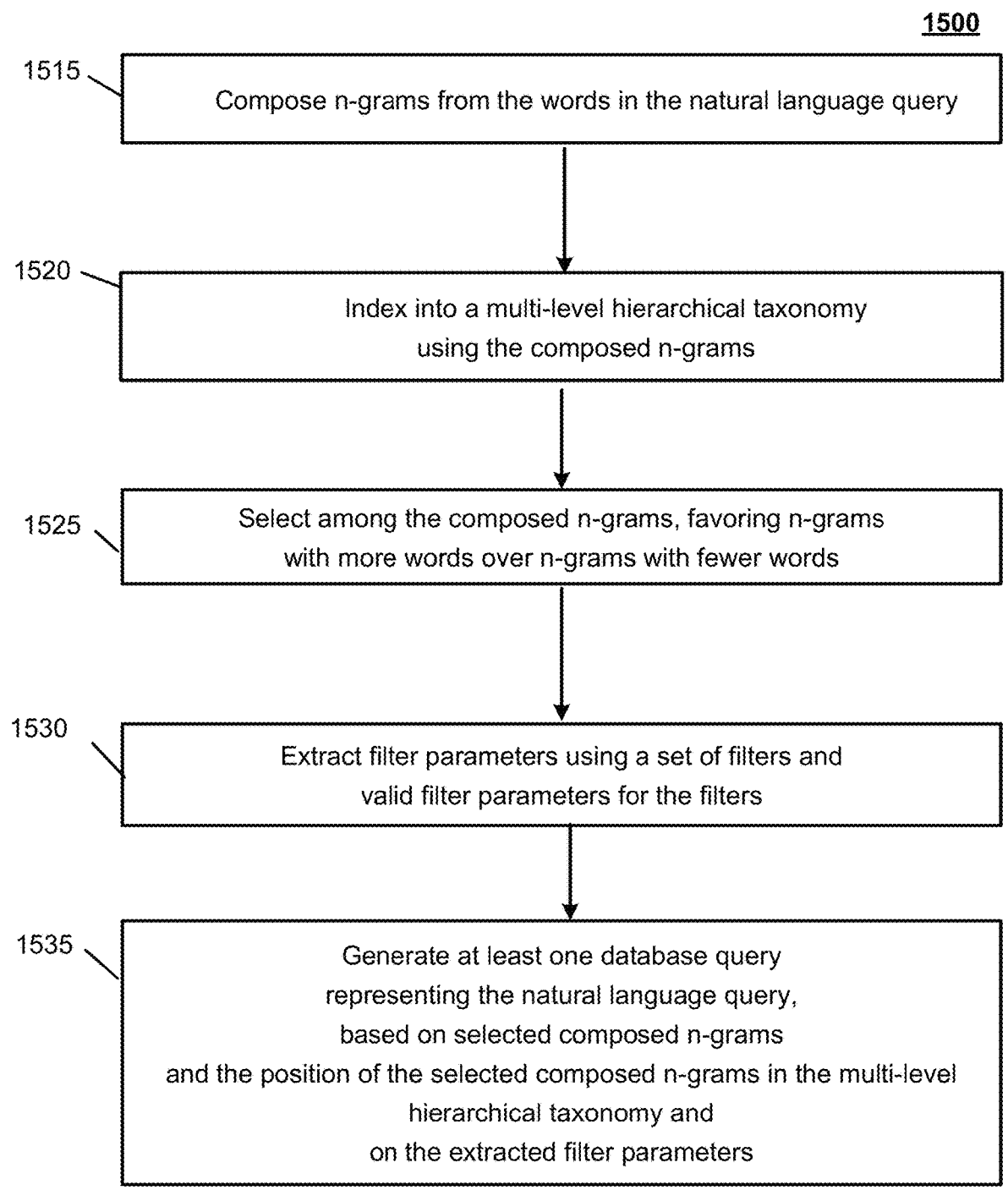
FIG. 15 Workflow

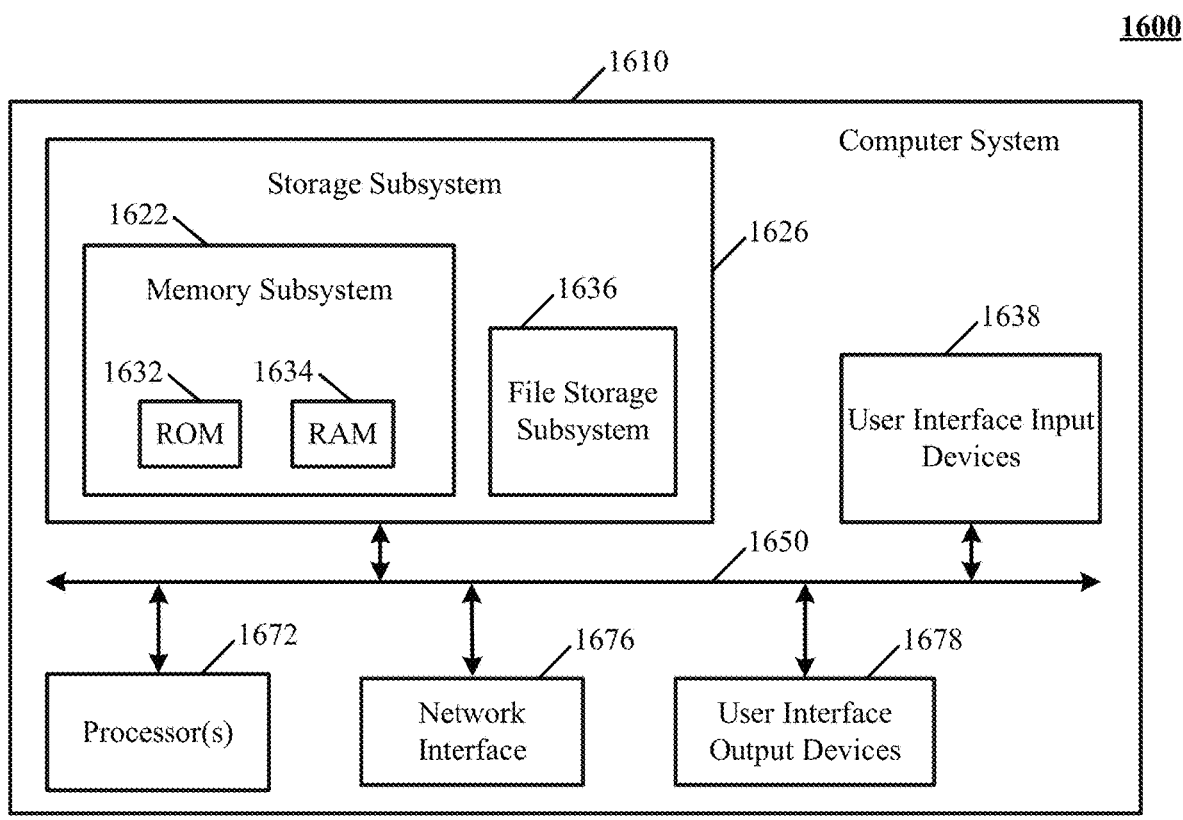
FIG. 16 Computer System

NATURAL LANGUAGE SEARCH WITH SEMANTIC MAPPING AND CLASSIFICATION

RELATED APPLICATION

This application is a continuation of U.S. patent application Ser. No. 15/147,113, entitled "Natural Language Search with Semantic Mapping and Classification," filed on May 5, 2016, which claims the benefit of U.S. provisional Patent Application No. 62/171,971, entitled, "Natural Language Search with Semantic Mapping and Classification," filed on Jun. 5, 2015. The provisional and non-provisional applications are hereby incorporated by reference for all purposes.

BACKGROUND

The disclosed technology relates to implementing natural language search with semantic mapping and classification; that is, discerning the intent of a user's search query and returning relevant search results.

Search engines are designed to search for information on the World Wide Web, with search results presented as search engine results web pages, images and other types of files. Some search engines also mine data available in databases or open directories, and maintain real-time information by running an automated web crawler which follows the links on the site. The search engine then analyzes the contents of each page to determine how it should be indexed (for example, words can be extracted from the titles, page content, headings, or special fields called meta tags).

Data about web pages is stored in an index database for use in later queries. The index helps search engines find information relating to the query as quickly as possible. Some search engines store all or part of the source page (referred to as a cache) as well as information about the web pages, whereas others store every word of every page they find. This cached page holds the actual search text since it is the one that was actually indexed, so it can be very useful when the content of the current page has been updated and the search terms are no longer in it.

When a user enters a query into a search engine (typically by using one or more keywords), the engine examines its index and provides a listing of best-matching web pages according to its criteria, usually with a short summary containing the document's title and sometimes parts of the text. Most search engines support the use of the Boolean operators, and some search engines provide an advanced feature called proximity search, which allows users to define the distance between keywords. There is also concept-based searching where the research involves using statistical analysis on pages containing the words or phrases for which a user searches. As well, natural language queries allow the user to enter a question in the form one would ask to a human.

A natural language search engine would, in theory, find targeted answers to user questions (as opposed to keyword search). For example, when confronted with a question of the form 'which U.S. state has the highest income tax?', conventional search engines ignore the question and instead search on the keywords 'state', 'income' and 'tax'. Natural language search, on the other hand, attempts to use natural language processing to understand the nature and context of the question, more specifically the underlying intent of the user's question, and then to search and return a subset of the web that contains the answer to the question. If it works, results would have a higher relevance than results from a keyword search engine.

The usefulness of a search engine depends on the relevance of the result set it returns. While there may be millions of web pages that include a particular word or phrase, some pages may be more relevant, popular, or authoritative than others. Most search engines employ methods to rank the results to provide the best results first. How a search engine decides which pages are the best matches, and what order the results should be shown in, varies widely from one engine to another. Many search engines rely on title match, category lookup, and keyword frequency within user reviews, which is insufficient for all but the simplest queries.

An opportunity arises to develop better systems and methods for implementing natural language search with semantic mapping and classification.

SUMMARY

The disclosed technology relates to implementing natural language search with semantic mapping and classification. The technology further discloses systems and methods for including social search, making it possible for users to include input from friends in search results.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4A shows an example of a multi-level classification module for a local search system.

FIG. 4B shows an example of a multi-level classification module for a cybersecurity system.

FIG. 5A shows outcomes of a semantic understanding study.

FIG. 5B shows outcomes of a local search relevancy study.

FIG. 6A shows a dynamic re-ranking use case example for local search system.

FIG. 6B shows a dynamic re-ranking use case example for a cybersecurity system.

FIG. 7 shows an example of a user interface for a local search system.

FIG. 8 shows dropdown details of potential search result features for a local search system.

FIG. 9 and FIG. 10 are listings of an example disambiguate query function.

FIG. 11 is a table of example data structures for semantic disambiguation.

FIG. 12 is a code listing of an example for-with rule-handling function.

FIG. 13 is a code listing for an example conjoin rule-handling function.

FIG. 14 shows an example of a multi-level hierarchical structure.

FIG. 15 shows an example workflow for a natural language search with semantic mapping and classification.

FIG. 16 an example computer system used for natural language search with semantic mapping and classification.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Most search problems can be formulated in terms of search space and target. It is a significant advancement to identify a specific, defined search space of interest for a query. For example, a local search space can be utilized for quickly answering difficult questions like, 'What's happening this weekend?' 'What restaurants do my friends like in Portland?' or 'What can we do with the kids, that's open right now?' In the cybersecurity domain, an example of this would be 'Find all endpoints which have been infected by a virus in the past month.'

Search problems in a particular domain require an understanding of the user's intent that traditional search methods lack, including a sense of time, domain and situational context, user preferences and the history of previous searches in the domain of interest. In an age in which speaking to technology is becoming the norm and user expectations are skyrocketing, semantic search is more important than ever. Ultimately, semantic query understanding and search relevancy will dominate as search requirements. The disclosed technology offers a customizable flexible technology designed to be taught about a domain and to be able to systematically adapt to its unique needs.

Environment

Figure 1:
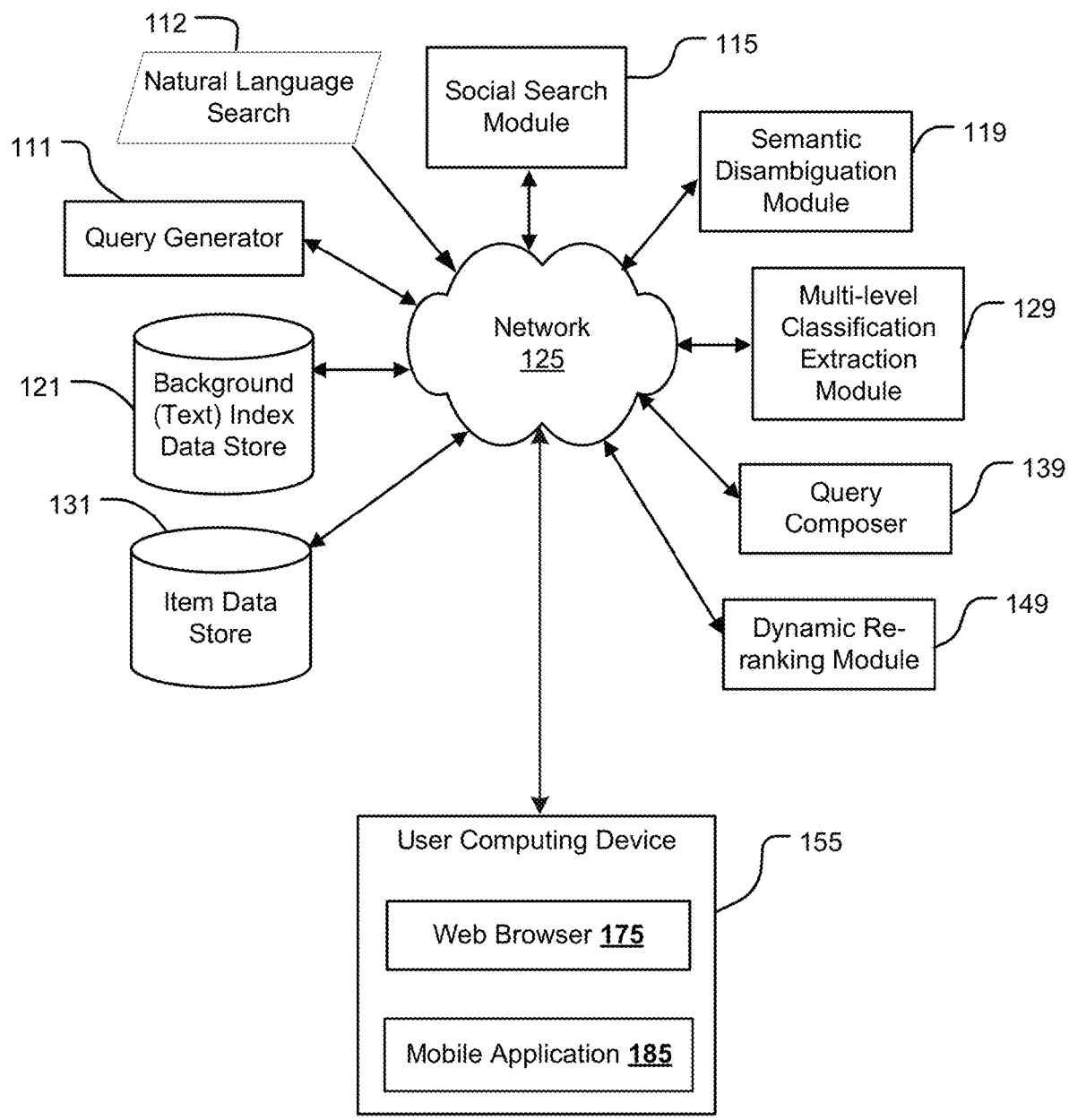
FIG. 1 illustrates one implementation of an environment for implementing natural language search with semantic mapping and classification.

FIG. 1 illustrates one implementation of a natural language search with semantic mapping and classification environment 100 that includes query generator 111, natural language search 112, social search module 115, semantic disambiguation module 119, background index data store 121, multi-level classification extraction module 129, item data store 131, query composer 139, dynamic re-ranking module 149 and network 135.

Natural language search 112 captures, transforms and delivers input from a search requestor (for example, a question to be answered, or a phrase that describes what is desired). Input can be via spoken words, text entered by a user, or by another input mechanism.

Figure 2:
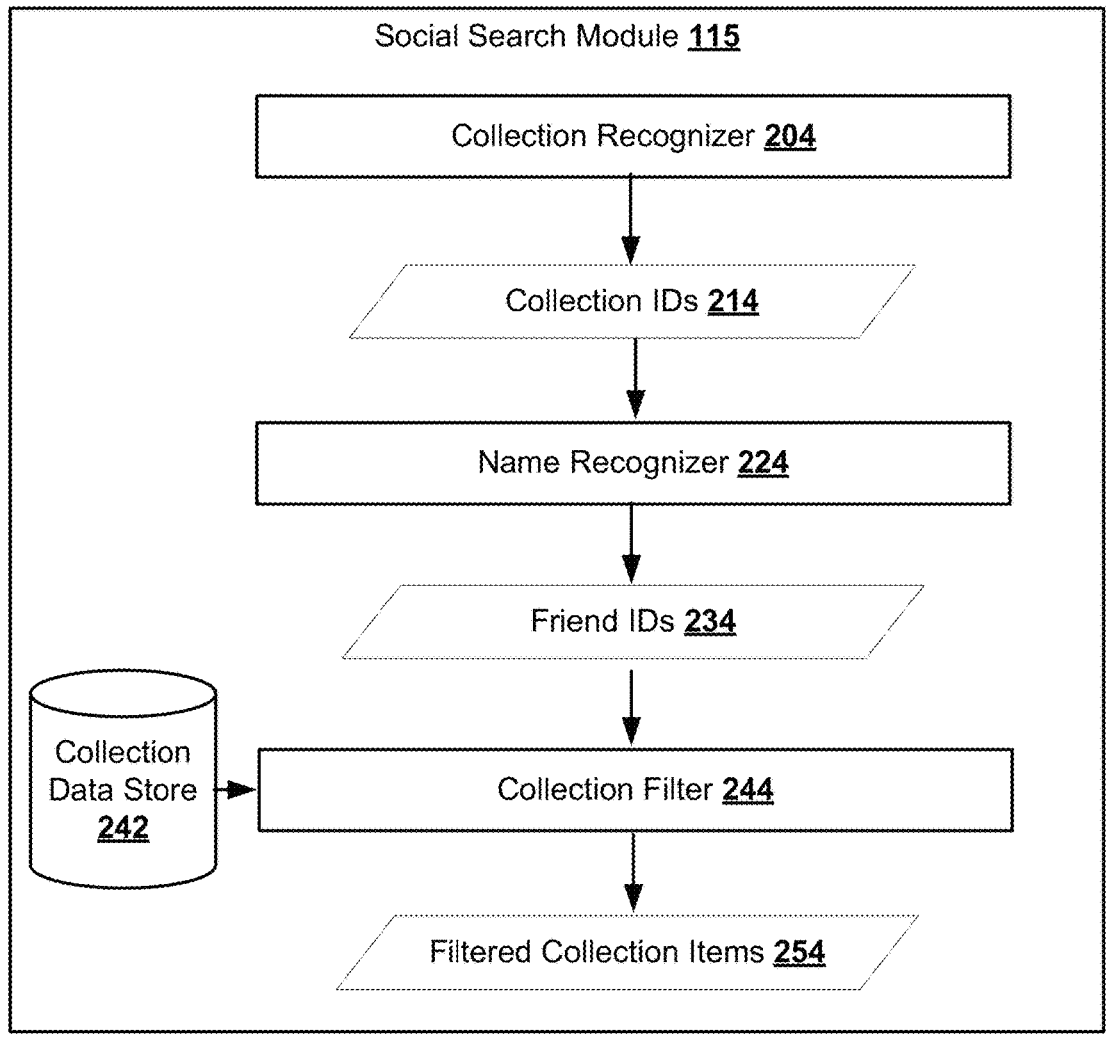
FIG. 2 shows an example of a social search module.

Social search module 115, shown in FIG. 2, includes collection recognizer 204 which looks for key terms that identify a collection in the local search space, such as 'like', 'reviewed', 'rated', etc. If no collections are found, then the search proceeds to semantic disambiguation module 119 and multi-level classification extraction module 129, described below. For the case in which one or more key terms that identify a collection are found, collection recognizer 204 sends collection IDs 214 to name recognizer 224. Name recognizer 224 looks for known name terms in the search input, filters the search results by known names of friends of the requestor, and sends the friend IDs 234 to collection filter 244. Alternatively, the requestor can specify all friends, using a keyword such as 'friends'. Collection filter 244 receives matching results from the search and receives input from collection data store 242, which includes friend actions and associations such as 'places I rated highly', 'events I'm interested in', and 'restaurants my friends have been to'. Collection filter 244 filters the results using the collection IDs 214 and friend IDs 234, and sends the filtered collection items to dynamic re-ranking module 149.

Figure 3:
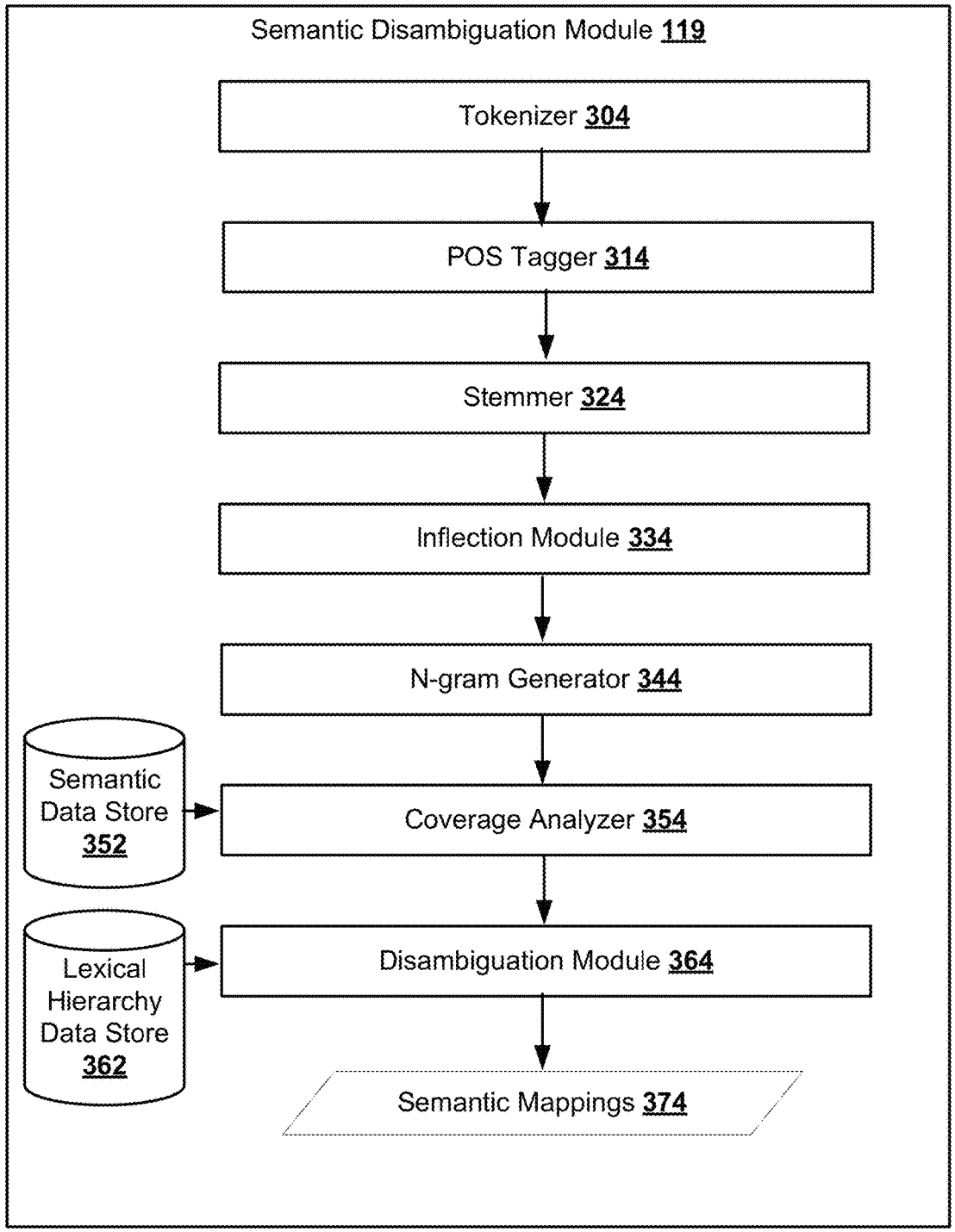
FIG. 3 shows an example of a semantic disambiguation module.

Semantic disambiguation module 119, shown in FIG. 3, includes tokenizer 304, POS (parts of speech) tagger 314, stemmer 324, inflection module 334, n-gram generator 344, coverage analyzer 354, semantic data store 352, disambiguation module 364, lexical hierarchy data store 362, and semantic mappings 374. Tokenizer 304 segments text into meaningful units. POS (parts of speech) tagger 314 processes the sequence received from tokenizer 304, attaching a part of speech tag to each word. Stemmer 324 and inflection module 334 produce alternative word forms (stems, tenses, gender, etc.) for the n-gram generator 344 which generates n-grams: contiguous sequences of n items from the given sequence of text or speech. Semantic data store 352 receives and stores input from the natural language search 112, and provides input to coverage analyzer 354, which chooses n-gram combinations, favoring longer n-grams and more coverage of the original tokens. Disambiguation module 364 uses the multi-level hierarchical taxonomy stored in lexical hierarchy data store 362 to select semantics as semantic mappings 374. Semantic mapping examples are described later. The selected semantics are passed to query composer 139.

Multi-level classification extraction module 129 extracts classifications. Each classification extractor identifies values described by the input to natural language search 112. The local search example includes datetime extractor 422, location extractor 424, price range extractor 426, and label extractor 428 in FIG. 4A. Datetime extractor 422 outputs a datetime range 432. Example datetime input words include 'this weekend', 'next Monday' and 'tomorrow'. Location extractor 424 uses geocoder 434 and outputs geohashes 444. Location input term examples include 'neighborhood', 'cross street', 'zip code', 'address', and the name of a place or landmark. Geohashes are short strings that represent a bounding box; longer geohashes are more precise (smaller) bounding boxes. (A geohash is a latitude/longitude geocode system—a hierarchical spatial data structure which subdivides space into buckets of grid shape.) Price range extractor 426 selects input terms, such as 'cheap' or '$40-$60', that describe the price range and outputs a price range 436. Label extractor 428 extracts labels such as 'classy', 'casual', and 'good for kids' from the input string to the natural language search 112.

In another example, for a cybersecurity search system, multi-level classification extraction module 129 could include datetime extractor 422, location extractor 424, number range extractor 456 and question extractor 458 in FIG. 4B. This system is described in more detail later.

Results of the multi-level classification extraction module 129 can be used as search filters to restrict the items to be retrieved from the text index or database. A filter can be expanded or restricted as needed, to include more or fewer results, to expand or contract a datetime range or to handle varying degrees of ambiguity. Subsequent classification searches benefit from a restricted search space. Results of the multi-level classification extraction module 129 can also be used by the dynamic re-ranking module 149, to favor items that more closely match the results.

Background index data store 121 includes background indexing text, based on scoring mechanisms that depend on the kind of item, with absolute scores pre-calculated in the background to increase efficiency. Score pre-calculation makes it possible to send the items with the absolute top matching scores to the dynamic re-ranking module 149. Periodically, at regular or specified intervals, background index data store 121 can be updated with new information. In an example implementation of a natural language search with semantic mapping and classification, a continuous automated offline process extracts, transforms and loads approximately 10M items per week, from over 80 data feeds; and de-duplicates and merges entries using approximated string matching (also referred to as fuzzy string matching) and multi-source merging. Index entries are classified and features are extracted using machine learning and domain knowledge similarity vectors, and qualitative ranking and quantitative scoring are added to the index entries.

Query composer 139 combines filter output from the multi-level classification extraction module 129 with output from semantic mappings 374, to produce a query specification data structure to send to the query generator 111. Query generator 111 receives and uses the query specification data structure from query composer 139 to generate a finalized search specification in the form of a database query structure that can be used to initiate the search of background index data store 121 and item data store 131, which includes the data about each item.

Dynamic re-ranking module 149 uses real-time scoring mechanisms to re-rank search results such that items that more closely match the query specification and user preferences are given higher rank. Dynamic re-ranking is responsive to the active query, favoring real-time context over static item data stored in the database. Scoring mechanisms depend on real-time context, such as the current time of day, a given date and time range, the distance from a given location, or the preferences of the user performing the search. Example ranking parameters are shown in FIG. 6A and FIG. 6B and described below.

For a local search use case, dynamic re-ranking module 149 includes consideration of the following features: geographic distance 622; time range overlap 624 which ranks how close an item is to the specified datetime range 432— such as whether a place is open, or how soon until a show starts; features category overlap 632; and classification label overlap 634 which ranks how much an item in the database overlaps with the query specification. Items may match one category or classification label, or they may match many labels, and the disclosed technology favors items that match many category or classification labels over items that match one or a few labels.

For a cybersecurity use case, dynamic re-ranking module 149 favors items with severity score 652 or priority score 654 that is 'high' or 'critical'. While the search may produce items in multiple levels of severity and priority, the disclosed technology favors items at the higher levels, because they are more important to act on. This example is described later as a separate use case.

Natural language search with semantic mapping and classification environment 100 further includes a user computing device 155 with a web browser 175 and a mobile application 185. In other implementations, environment 100 may not have the same elements as those listed above and/or may have other/different elements instead of, or in addition to, those listed above.

In some implementations, the modules of natural language search with semantic mapping and classification environment 100 can be of varying types including workstations, servers, computing clusters, blade servers, server farms, or any other data processing systems or computing devices. Modules can be communicably coupled to the data store via a different network connection. For example, item data store 131 can be coupled to a direct network link. In some implementations, it may be connected via a WiFi link or hotspot.

In some implementations, network(s) 135 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 155 includes a web browser 175 and/or a mobile application 185. In some implementations, user computing device 155 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Measuring Performance: A Comparative Study

The disclosed natural language search technology, with semantic mapping and classification, surpasses existing searches in terms of both semantic understanding and local search relevancy. Test results showing increased performance and local search relevancy are described below. The study compared the three most frequented search services in terms of semantic query understanding and local search relevancy.

The study tested the disclosed technology (Weotta), Siri, and Google—the three services that have significant query understanding. The test sample space was 100 of Yelp's™ queries randomly selected to represent a broad sample space of common social local needs. Two metrics were used to measure performance: semantic understanding and local search relevancy. The study was completed in October, 2014 using publicly available data.

In one example search query in the study, 'girls night out', only Weotta was able to process the social context, a significant step toward machines adapting to real-world semantic needs. In another example, for a search for 'handicap accessible restaurants', Siri® only understood 'restaurants', so provided its default list of San Francisco restaurants. Apple® maps returned no results for the search, and pushed the search to Yelp™, which found places that are not handicap friendly because Yelp™ is doing text lookup in reviews with no sentiment analysis and no query comprehension. Further, when a search query included a time element, such as 'food right now', 'things to do this weekend', or 'Friday happy hour', Weotta excelled relative to the other two search engines due to its geo-temporal understanding.

A general difficulty of measuring search result relevance (performance) lies in the fact that a recognized phrase can have a different length or word order from the reference phrase (supposedly the correct one). The word error rate is a metric of performance, working at the word level. Mean semantic accuracy (MSA) is a method for calculating how much of a phrase a service can understand. MSA is based on the word error rate metric.

The study results were measured in terms of mean semantic accuracy (MSA). The maximum a service could be awarded was 1 point per query. Partial points were given for partial understanding. The method of calculating the mean semantic accuracy and the related error rate is described below, followed by an example set of data.

$$MSA = \sum_{q=1}^{Q} \frac{U(q)}{N(q)} \bigg/ Q$$

U(q)=number of semantic concepts understood
N(q)=total number of semantic concepts in the query
To calculate the error rate for an example set of values, for U(q1)=number of unknown words in q1 and N(q1)=total number of words in q1, error rate=U(q)/N(q). For a value of Q=3 queries, and U(q1)/N(q1)=3 words/5 words, U(q2)/N(q2)=1 word/1 word, and U(q3)/N(q3)=5 words/7 words, the MSA=77%, and the resulting error rate=23%; where SA(q)= one minus the error rate, where SA=semantic accuracy. MSA=sum(SA(q) for q in Q)/len(Q).

Results for the semantic understanding aspect of the study are shown in FIG. 5A: only a 2% error rate for Weotta 526, a 46% error rate for Siri 546, and a 64% error rate for Google 566. We describe an example query result that contributed to the results below.

Local search relevancy was measured using mean average precision (MAP), which is based on relevancy count with a 20 result maximum. The study compared the most frequented services in terms of local search relevancy.

$$MAP = \sum_{q=1}^{Q} \frac{AveP(q)}{Q}$$

Q=number of queries
q=1, 2, . . . Q
Average precision for a query, when looking at first 20 results=number of relevant results/20. For example, for Q=3 queries, AveP(q1)=18/20, AveP(q2)=15/20, AveP(q3)=20/20. MAP=88% and error rate=12% MAP=Mean Average Precision. Results for the local search relevancy aspect of the study are shown in FIG. 5B: only a 3% error rate for Weotta 576, with a 23% error rate for Yelp™ 586, the closest contender.

Performance results, obtained using the disclosed technology, exceed results for existing search technology in terms of both semantic understanding and local search relevancy.

The disclosed technology includes a method for generating a top-down outline and determining what components are needed, followed by a process of building specific components from the bottom up. The method then composes and orders the components together. Additional bottom-up development can include the addition of components, such as a social search module with a collection recognizer 204 described later.

When there are unknown search terms, the terms can be included as optional boosting terms for a text search, so any results that contain those terms get a score boost. When a significant part of the query is not recognized, a diverse selection of results can be included and the user can be informed that the results do not reflect exactly what was queried.

For the disclosed natural language search with semantic mapping and classification, natural language query inputs are transformed into a search specification for a database. The disambiguation process includes a sequence of ordered transformations: tokenize string, generate n-grams, expand n-grams, select term buckets, choose best n-grams, select bucket mapping, and apply rules to generate query term mappings. The query term mappings are disambiguated on multiple common levels of classification, including datetime criteria, location criteria, and other use case-specific features. The search specification is generated from the query term mappings with disambiguated times and location ranges, as described later.

An example sequence of transformations is described in Python programing language by search_items_messages_args which calls the disambiguate_query function below. In the q3 step, if location information is part of the natural language input query, then the location gets refined.

```
def search_items_messages_args(q, location, lat=None,
    lng=None, user_id=None, tzinfo=None, when=None,
    limit=20, nocorrect=False, notitle=False, noloc=False,
    venue_events=False, noexpand=False, **kwargs):
    q=q.strip( )#just in case
    social_args, social_kwargs=[ ], { }
    q, colltype_ids, social_kwargs=search.social_chun-
        ker_kwargs(q, user_id)
    social=True if user_id and colltype_ids else False
    term_mappings, terms=mappings.disambiguate_query
        (q)
    q2, when, until=datetimes.search_when_until(q, loca-
        tion, term_mappings, terms)
    q2,  price_spec=prices.maybe_parse_price_spec(q2,
        term_mappings)
    if not noloc and location:
        q3, loc=locations.maybe_refine_location(q2, loca-
            tion,  term_mappings=term_mappings,  when=
            when, until=until, lat=lat, lng=lng)
    elif lat and lng:
        q3, loc=q2, (lat, lng)
    else:
        q3, loc=q2, None
```

We describe an example user interface and data structures for semantic search for a local search use case below.
User Interface for Local Search Use Case The disclosed natural language search with semantic mapping and classification can be implemented for local search. In an example implementation, shown in FIG. 7, when a user enters a query, the input string gets transformed to feature values for subject 715, type 718 and a group of maybe-features 726. A score 722 and weight 724 are calculated and used to select and rank the items to be delivered as query results. In the example entry of 'classy Italian San Francisco', shown in interface 700 in FIG. 7, transformations of the query input yield a detailed query specification: subject 715 is identified as 'food', the label count shows 'classy' as an important distinguishing query feature, and type 718 is identified as 'Italian'. Additional features are listed as 'maybe-feats', shorthand for maybe-features 726, including entries such as dressy, fantastic décor, etc. An example of a radius feature, the radius 710 is a very small number, since San Francisco is a dense city. For a less dense suburban area such as Mountain View, Calif., the radius would be a larger number. An example of the transformations used to generate values for these query elements is described later.

In this example, score 722 and weight 724 features are used to determine which search results to display to the user, and in what order. Weight is a query-dependent, text-indexing measure. For example, if disambiguation finds a menu term, then terms in menus are assigned higher scores than terms in reviews. Otherwise menus may be at the same weight as reviews, and item titles and descriptions will have a higher weight. Score includes factor weight 724, plus average rating, popularity, and confidence in the data; and dynamic factors such as the mention of 'classy Italian' in reviews.

Figure 8:
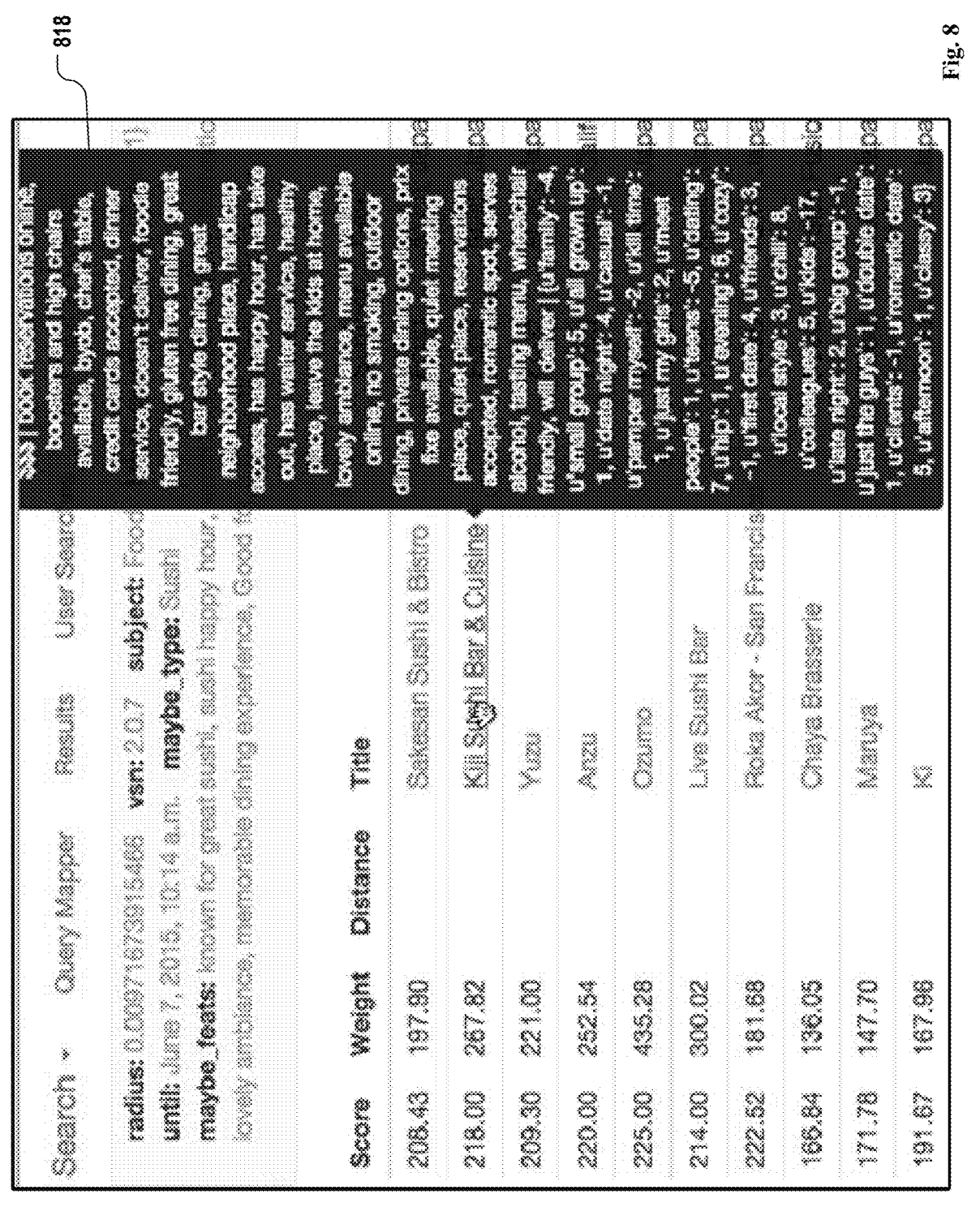

FIG. 8 shows an example list of features and values 818 gleaned from the background index data store 121 and from natural language search 112, compiled as part of the disclosed transformations.

Data Structure Transformations for Local Search Use Case

To achieve low error rates, a local search needs to understand where a user is, the time of day, their past history, and many other factors including social connections, and social signals. In the following examples, natural language search query entries get transformed by a series of disclosed transformations, resulting in an increase in semantic understanding and local search relevancy for the search results.

The method disclosed below disambiguates the search input. The disambiguation module 364 includes the disambiguate_query function, shown below, which includes as input the multi-level hierarchical taxonomy stored in lexical hierarchy data store 362 to select semantic mappings 374. For an example input value of 'classy Italian tomorrow', semantic mapping outputs are {Italian: {type: [(food, Italian)]}, tomorrow: None, classy: {label: [classy]}}. Disambiguation categorizes 'Italian' as a specific type of 'food', i.e., Italian; 'tomorrow' needed no disambiguation because it was handled by the datetime extractor 422; 'classy' was disambiguated as a 'label'.

```
def disambiguate_query(q, best=True, f_select_term_
    buckets=select_term_buckets,    f_select_bucket_
    mapping=select_bucket_mapping):
    words=tokenize_string(q)
    grams=generate_ngrams(words, min(MAX_NGRAM,
        len(words)))
    if not grams: return { }, [ ]
    exgrams=expanded_word_form_ngrams(grams)
```

The disambiguation query function includes tokenizer 304, shown below, which segments text into meaningful units. For the example input 'classy Italian tomorrow', three tokens were found: 'classy', 'Italian', and 'tomorrow'.

```
def tokenize_string(s):
    return [w for w in tokenizer.tokenize(normalize_
        string(s).lower( )) if w not in punctuation and w]
```

The identified tokens are used as input values to n-gram generator 344 to generate n-grams. The results include the following set of six n-grams, ranging from one word to three words: 'classy', 'Italian', 'tomorrow', 'classy Italian', 'Italian tomorrow', 'classy Italian tomorrow'. The length of the possible n-grams depends on the number of words in the query, and can have a static maximum length.

The next part of the disambiguation process is to map the n-grams to extended word form n-grams via stemmer 324 and inflection module 334, combining same words in different forms (plurals and spellings in this case). The results are 'tomorrows', 'Italians', 'classics', 'class', 'classy Italian', 'Italian tomorrow', 'classy Italian tomorrow', 'classy Italians', 'Italian tomorrows', 'classy', 'classes', 'classy Italian tomorrows', 'tomorrow', 'Italian'.

Disambiguation continues, selecting buckets for the expanded n-grams. The function for selecting term buckets is listed below, and is called by disambiguate_query 912, shown in FIG. 9. Buckets are selected as keys and one or more canonical word values recognized as associated with the key The bucket key value results are (type, Italian), (label, classy). 'Tomorrow' was ignored because it had no bucket. In some implementations, stop words such as 'but' are removed.

```
def select_term_buckets(terms, cursor=None):
    q=SELECT_TERM_BUCKETS % u','.join(['% sterm
        % d % s' % ('%(', i,')s') for i in range(len(terms))])
    args={'term % d' % i: t for i, t in enumerate(terms)}
    return fetch_rows(q, args, cursor=cursor)
```

The disambiguation transformation continues, using the n-grams as inputs to choose the best n-grams, via the choose best ngrams function, with results 'classy' and 'Italian'. In general, ranking favors n-grams with more words, and n-gram combinations that cover more words in the query.

Code enclosed in a pair of triple quotes is included for a Python doctest that demonstrates the input and output expectations of the function. Doctest searches for text that looks like interactive Python sessions, and then executes those sessions to verify that they work as expected. In the example shown below, for an input of ['sake bars', 'wine bars', 'wine', 'sake'] the expected best n-gram outputs are ['sake bars', 'wine bars'].

```
def choose_best_ngrams(terms):
    '''
    >>>choose_best_ngrams(['t1 t2', 't1', 't2'])
    ['t1 t2']
    >>>choose_best_ngrams(['t1 t2', 't1 t3', 't2'])
    ['t1 t2', 't1 t3']
    >>>choose_best_ngrams(['cheap', 'food', 'take out',
        'very cheap'])
    ['very cheap', 'take out', 'food']
    >>>choose_best_ngrams(['cheap',   'food',   'very
        cheap'])
    ['very cheap', 'food']
    >>>choose_best_ngrams(['sake bars', 'wine bars',
        'wine', 'sake'])
    ['sake bars', 'wine bars']
    >>>choose_best_ngrams(['wine bars', 'wine', 'red
        wine', 'bars'])
    ['wine bars', 'red wine']
    >>>choose_best_ngrams(['locals',   'san francisco',
        'things to do'])
    ['san francisco', 'things to do', 'locals']
    >>>choose_best_ngrams(['beer garden', 'gardens'])
    ['beer garden']
    >>>choose_best_ngrams([u'&', u'pb', u'pb&j'])
    [u'pb&j']
    >>>choose_best_ngrams([u'&', u'cheese', u'macaroni', u'macaroni and cheese', u'macaroni &
        cheese', u'macaroni cheese'])
    [u'macaroni and cheese']
    >>>choose_best_ngrams([u'&', u'grits', u'shrimp',
        u'shrimp and grits', u'shrimps', u'shrimp grit'])
    [u'shrimp and grits']
```

```
>>>choose_best_ngrams([u'&', u'grits', u'shrimp',
    u'shrimp and grits', u'shrimps'])
[u'shrimp and grits']
>>>choose_best_ngrams([u'art', u'arts', u'perform-
    ing', u'performing arts'])
[u'performing arts']
>>>choose_best_ngrams(['theaters', 'theater'])
['theaters']
>>>choose_best_ngrams(['theater', 'theaters'])
'''
    return ranked_ngrams(terms)[0][0]
```

After choosing the best n-grams, bucket mapping follows, based on the best n-grams and term buckets. Semantic data is looked up, via the select_bucket_mapping function, based on n-gram & bucket inputs, and the values are later used for the database lookup. Bucket mapping results for the example in our use case are {Italian: {type: [(food, Italian)]}, tomorrow: None, classy: {label: [classy]}}. FIG. 10 includes the second half of disambiguate_query 912, which shows the return of term rules and grams 1082. These semantic mappings 374 are made available to query composer 139.

```
def select_bucket_mapping(buck_id, term, cursor=None):
    if buck_id in TERM_MAPPINGS: return term
    if buck_id not in BUCKET_SELECTS: return
        {buck_id: None}
    args={'term': term, 'buck_id': buck_id, 'lang_id':
        'en'}
    rows=fetch rows(BUCKET_SELECTS[buck_id], args,
        cursor=cursor)
    return rows
```

Term rules are returned by disambiguate_query 912 and are available for use by function for_with_rules 1212 in FIG. 12 and conjoin_rules 1314 in FIG. 13. The two functions, for_with_rules 1212 and conjoin_rules 1314, apply rules that combine multiple criteria derived from words of the natural language search that include 'and', 'with' and 'or.' Each function can each add an additional key to the term mappings (with' and '&' respectively)—a list of terms that get special handling in query composer 139, which looks for 'with' and '&', and for 'with' terms. Specific key fields, such as 'labels' are extracted as required, and other key fields such as 'subject' become optional. For '&' terms, query composer 139 ensures that the mappings are combined via a union operation, so that multiple subjects are searched for appropriately, instead of doing an intersection of subjects. False positive unknown words are removed. In the three data structure examples shown below, term mappings and query composer results are shown for three natural language queries: 'restaurants for a date', 'bar with a view', and 'dinner with a movie', with term mappings and query results listed.

```
'restaurants for a date'→disambiguate_query+for_with-
    _rules
term_mappings=
{
    'restaurants': {'subject': ['Food']},
    'date': {
        'subject': ['Drinks', 'Food', 'Movies', 'Music',
            'Performance'],
        'label': ['dating'],
        'feats': ['date bar', 'romantic spot']
    },
    'with': ['date']
}
>query composer=
{
    'subject': ['Food'],
    'maybe subject': ['Drinks', 'Movies', 'Music', 'Perfor-
        mance'],
    'label': ['dating'],
    'maybe_feats': ['date bar', 'romantic spot']
}
'bars with a view'→disambiguate query+for_with_rules
term_mappings=
{
    'bars': {'subject': ['Drinks']},
    'view': {'feats': ['nice view']},
    'with': ['view']
}
→query composer=
{
    'subject': ['Drinks'],
    'feats': ['nice view']
}
'dinner and a movie'→disambiguate_query+conjoin-
    _rules
term_mappings=
{
    'dinner': {'subject': ['Food']},
    'movie': {'subject': ['Movies'] },
    '&': ['dinner', 'movie']
}
→query composer=
{
    'subject': ['Food', 'Movies']
}
```

For the local search use case, another natural language input query, 'high end sushi', yields the semantic data structure listed below. 'Sushi' maps to both the 'menu' and 'type', as shown in a multi-level hierarchical data structure tree in FIG. 14. The root 1414 includes a few examples of classification disambiguation results for natural language queries. Subject 1422, label 1424, and features 1426 are nodes at the first level beneath the root of the hierarchical taxonomy for the local search example of use case one. For example, subject 1422 for the 'high end sushi' includes subject 'food', shown in the semantic data structure below. At the next level of the hierarchical taxonomy, type 1432 includes a value of 'sushi'; and at the lowest level of the taxonomy example, menu 1442 includes a value of 'sushi'.

```
"sushi"→['menu', 'type']
"high end"→
("sushi", "menu")→{"menu": ["sushi"]}
("sushi", "type")→{"subject": ["Food"], "type": ["Su-
    shi"]}
("high end", "label")→{"label": ["classy"]}
```

Features 1426 in a natural language query can be transformed; examples include handicap accessible→handicap access, romantic→romantic spot, lovely ambiance, and patio→outdoor dining.

Social search module 115 determines names of friends whose actions and associations are related to the user's query. The function definition for social_chunker_kwargs which searches for friends, and returns identifiers for friends whose actions and associations are related to the input query, is shown below. Note that if no related objects are identified in the search query, then no friend names or identifiers get returned. (Kwargs are one or more keyword arguments.)

```
def social_chunker_kwargs(q, user_id):
    if not user_id: return q, [ ], { }
    results=social_chunker.chunk_query(q)
    if not results or len(results)==1: return q, [ ], { }
```

```
qparts, friend_names, linktype_ids, colltype_ids=[ ],
   [ ], [ ], [ ]
for obj in results:
   if len(obj)==1:
      qparts.append(obj ['text'])
   elif 'tag' in obj:
      tag=obj ['tag']
      if tag['type']=='collection':
         colltype_ids.extend(tag['value'])
      elif tag['type']=='generic_person':
         linktype_ids.extend(tag['value'])
      elif tag['type']=='specific_person':
         friend_names.extend(tag['value'])
   return u".join(qparts), colltype_ids, {'friend_names':
      friend_names, 'linktype_ids': linktype_ids}
```

Six example sets of the transformations from natural language inputs are shown in FIG. 11: from input query terms 1112 to n-gram generation from stems and inflections 1114, to semantic mappings 1116, to disambiguation 1118 with feature key-value relationships. A comparison of the contrasting results of searching for 'comedy' and searching for 'comedy show' offers an example of the value of semantic understanding. For search input 'comedy' 1122, the disambiguation transformations yield a query structure for a subject movie or performance, type comedy. Alternatively, the search for 'comedy show' 1132 yields a query structure of subject performance; type comedy. A search that includes a comedy movie yields very different results than a search for a comedy performance.

The disclosed technology includes a customized search filter to restrict the items to be retrieved from the background (text) index data store 121 and the item data store 131. As described earlier, multi-level classification extraction module 129 extracts classifications, such as date and time range criteria, price range criteria, etc. Any number of classifiers and extractors can be included. For example, many searches are restricted to a date and time range, such as the 'tomorrow' input in the example described earlier. Datetime functions determine the exact range to use, and then remove any associated terms from the query. The resulting output query becomes 'classy Italian' plus tomorrow's date and time range. An example implementation of the search_when_until function definition is shown below, and includes consideration of time zone, 'tzinfo'.

```
def search_when_until(q, location, term_mappings,
      terms):
   tzinfo=datelib.local_timezone(location=location)
   now=datetime.datetime.now(tzinfo).replace
      (tzinfo=tzinfo)
   return search_when_until_from_now(q, now, term_
      mappings, terms)
```

Each extracted classification, such as datetime described above, identifies and removes query input terms from natural language search 112, so that subsequent searches benefit from a restricted search space. Query composer 139 combines filter output from the multi-level classification extraction module 129 with the semantic mappings 374, to produce a query specification data structure to send to the query generator 111.

Query generator 111 receives and uses the query specification data structure from query composer 139 to generate a search filter that can be used to initiate the search of background index data store 121 and item data store 131. That is, the search features identified during the disambiguation transformations, and the information about extracted classifications are merged together to create the final search specification. No blunt text search need be performed because the generated search filter contains an inclusive meaning for each query input term as part of the database filters.

Cybersecurity Search System Use Case

The disclosed technology search layer can be applied to a second use case: a cybersecurity search system that translates FAA domain-specific natural language queries to executable searches of FAA logs. For the cybersecurity search system, multi-level classification extraction module 129 could include datetime extractor 422, location extractor 424, number range extractor 456 and question extractor 458 in FIG. 4B. One interesting difference for a cybersecurity search system is that datetime ranges are in the past, instead of future dates for a local search for a good restaurant for a hungry search user. Location extractor 424 uses geocoder 434 and outputs location 474. The natural language search 112 may specify a location, while stored records contain IP addresses. In this case, the location would be extracted from the query and used for filtering with GEO-IP lookups. Number range extractor 456 can include units, such as bytes, or percentages, as in 80% CPU usage. Question extractor 458 decides which answer type is best, such as counts, statistics, charts, lists, etc.

Dynamic re-ranking module 149 uses real-time scoring mechanisms to re-rank results such that items that more closely match the query specification and user preferences are given higher rank. For the cybersecurity use case, scoring mechanisms favor items with severity score 652 or priority score 654 that are 'high' or 'critical'. While the search may produce items in multiple levels of severity and priority, the disclosed technology favors items at the higher levels, because they are more important to act on. Risk score 662 can be a combination of the risk score from correlated events. For example, the risk score 662 of a user may combine with the risk score of an application they are using, along with the risk score of their business unit. Some search criteria are optional, or multiple values (conditional OR) can be searched for, across multiple events. The correlation score 664 measures how well an item correlates to the query spec, similar to category overlap 632 and classification label overlap 634 described for the local search use case described earlier.

An example set of the transformations for the cybersecurity search input query term 'high priority outages' 1162, to n-gram generation from stems and inflections 1164, to cybersecurity semantic mappings 1166, to disambiguation 1168 with feature key-value relationships, are shown in FIG. 11.

Natural Language Search Workflow

FIG. 15 is a flowchart 1500 of one implementation of natural language search with semantic mapping and classification. Flowchart 1500 can be implemented by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations.

At action 1515, the semantic mapping and classification system composes n-grams from the words in the natural language query. At action 1520, the system indexes into a multi-level hierarchical taxonomy using the composed n-grams.

At action 1525, the semantic mapping and classification system selects among the composed n-grams, favoring n-grams with more words over n-grams with fewer words, and more coverage of the input terms. At action 1530, the system extracts filter parameters using a set of filters and valid filter parameters for the filters. The available set of filters is based on the subject domain in which the query is posed.

At action 1535, the semantic mapping and classification system generates at least one database query representing the natural language query, based on selected composed n-grams and the position of the selected composed n-grams in the multi-level hierarchical taxonomy and on the extracted filter parameters.

Computer System

FIG. 16 is a block diagram of an example computer system 1600 for implementing a natural language search with semantic mapping and classification system. FIG. 16 is a block diagram of an example computer system, according to one implementation. The processor can be an ASIC or RISC processor. It can be an FPGA or other logic or gate array. It can include graphic processing unit (GPU) resources. Computer system 1610 typically includes at least one processor 1672 that communicates with a number of peripheral devices via bus subsystem 1650. These peripheral devices may include a storage subsystem 1626 including, for example, memory devices and a file storage subsystem, user interface input devices 1638, user interface output devices 1678, and a network interface subsystem 1676. The input and output devices allow user interaction with computer system 1610. Network interface subsystem 1676 provides an interface to outside networks, including an interface to corresponding interface devices in other computer systems.

User interface input devices 1638 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 1610.

User interface output devices 1678 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 1610 to the user or to another machine or computer system.

Storage subsystem 1626 stores programming and data constructs that provide the functionality of some or all of the modules and methods described herein. These software modules are generally executed by processor 1672 alone or in combination with other processors.

Memory 1622 used in the storage subsystem can include a number of memories including a main random access memory (RAM) 1634 for storage of instructions and data during program execution and a read only memory (ROM) 1632 in which fixed instructions are stored. A file storage subsystem 1636 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1636 in the storage subsystem 1626, or in other machines accessible by the processor.

Bus subsystem 1650 provides a mechanism for letting the various components and subsystems of computer system 1610 communicate with each other as intended. Although bus subsystem 1650 is shown schematically as a single bus, alternative implementations of the bus subsystem may use multiple busses.

Computer system 1610 can be of varying types including a workstation, server, computing cluster, blade server, server farm, or any other data processing system or computing device. Due to the ever-changing nature of computers and networks, the description of computer system 1610 depicted in FIG. 16 is intended only as one example. Many other configurations of computer system 1610 are possible having more or fewer components than the computer system depicted in FIG. 16.

Particular Implementations

In one implementation, a method of accurately translating the intent of a keyword-oriented natural language query includes processing words in a natural language query through semantic disambiguation and filter parameter extraction. The method includes semantically disambiguating words in the query, based at least in part on composing n-grams from the words in the query; and on indexing into a multi-level hierarchical taxonomy using the composed n-grams. The disclosed method further includes selecting among the composed n-grams, favoring n-grams with more words over n-grams with fewer words; and extracting filter parameters using a set of filters and valid filter parameters for the filters. The available set of filters is based, at least in part, on a subject domain in which the query is posed. Further, the method includes generating at least one database query, representing the natural language query, based at least in part on the selected composed n-grams and the position of the selected composed n-grams in the multi-level hierarchical taxonomy, and on the extracted filter parameters.

The disclosed method can include composing the n-grams by forming tokens from a string, followed by generating n-grams from the tokens, and generating expanded word form n-grams from the generated n-grams. The method further includes applying a thesaurus to translate at least one word in the query into a semantically equivalent canonical word recognized as a value in the multi-level hierarchical taxonomy.

In some implementations, the method includes nodes of the multi-level hierarchical taxonomy that include at least one key and one or more canonical word values recognized as associated with the key. The method further includes indexing into the multi-level hierarchical taxonomy, finding one or more nodes of the hierarchical taxonomy that include n-grams as canonical word values and assigning the n-grams, including expanded word form n-grams, to term buckets associated with the nodes.

The disclosed method can include, for each word instance in the query, selecting one of the n-grams using the word instance to assign to a particular node and rejecting any other n-grams using the word instance. The method can further include scoring and selecting among un-expanded and expanded word form n-grams for each word instance in the query. The method can also include term buckets that include a key value pair, with the value derived from the words in the query and the key derived from a node in the multi-level hierarchical taxonomy.

In yet other implementations, the method includes applying a conjunction rule that combines multiple criteria in the database query, the multiple criteria derived from the words of the natural language query that includes "and". The method further includes applying a for-with rule that combines multiple criteria in the database query, the multiple criteria derived from the words of the natural language query that include "for" or "with".

The disclosed method can include available filters in the set of filters that include at least one of a start and end time datetime search, a location search, a price range search, and a label extractor.

This method and other implementations of the technology disclosed can include one or more of the following features and/or features described in connection with additional methods disclosed. In the interest of conciseness, the combinations of features disclosed in this application are not individually enumerated.

Other implementations may include a computer implemented system to perform any of the methods described above. Yet another implementation may include a tangible computer-readable storage medium including computer program instructions that cause a computer to implement any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-implemented method of translating a natural language query, the method including:
processing words in the natural language query through semantic disambiguation and filter parameter extraction, using a processor, including:
semantically disambiguating words in the natural language query based on at least:
composing n-grams of varying lengths from the words in the natural language query;
searching for the composed n-grams in a multi-level hierarchical taxonomy, and selecting at least one semantic mapping of the composed n-grams from search results found in the multi-level hierarchical taxonomy, wherein the selecting favors the semantic mapping of composed n-grams having a greater number of words over the semantic mapping of composed n-grams having fewer words;
identifying a set of filters and valid parameters based, at least in part, on a context in which the natural language query is posed; and
using the set of filters and valid parameters to extract, from the semantic mapping, one or more filter parameters for use in a database query; and
generating a database query, representing the natural language query, based on at least the filter parameters and respective filters.

2. The method of claim 1, wherein composing the n-grams from the words in the natural language query includes extracting tokens from the natural language query, followed by generating the n-grams of varying lengths from the tokens, and generating expanded word form n-grams from the generated n-grams of varying lengths.

3. The method of claim 2, wherein composing the n-grams further includes applying a thesaurus to translate at least one word in the natural language query into a semantically equivalent canonical word or phrase representing a semantic mapping and recognized as a value in the multi-level hierarchical taxonomy.

4. The method of claim 1, wherein nodes of the multi-level hierarchical taxonomy each include at least one key and one or more canonical word values recognized as associated with the key.

5. The method of claim 1, wherein the searching in the multi-level hierarchical taxonomy includes finding one or more nodes of the multi-level hierarchical taxonomy that include the n-grams as canonical word values and assigning the n-grams, including expanded word form n-grams, to term buckets associated with the nodes.

6. The method of claim 5, further including, for each particular word in the query, selecting one of the n-grams using the particular word to assign to a particular node and rejecting any other n-grams using the particular word.

7. The method of claim 5, further including scoring and selecting among un-expanded and expanded word form n-grams for each word instance in the query.

8. The method of claim 5, wherein each term bucket includes a key value pair, wherein the value is derived from the words in the query and the key is derived from a node in the multi-level hierarchical taxonomy.

9. The method of claim 1, further including applying a conjunction rule that combines multiple criteria in the database query, the multiple criteria derived from the words of the query when the natural language query includes "and".

10. The method of claim 1, further including applying a for-with rule that combines multiple criteria in the database query, the multiple criteria derived from the words of the natural language query that include "for" or "with".

11. The method of claim 1, wherein available filters in the set of filters includes a date criteria.

12. The method of claim 1, wherein available filters in the set of filters include location criteria.

13. A computer implemented system applied to translate a natural language query, the computer implemented system including:
a processor, memory coupled to the processor, and program instructions stored in the memory that implement a method comprising:
processing words in the natural language query through semantic disambiguation and filter parameter extraction, including:
semantically disambiguating words in the natural language query based on at least:
composing n-grams of varying lengths from the words in the natural language query;
searching for the composed n-grams in a multi-level hierarchical taxonomy, and selecting at least one semantic mapping of the composed n-grams from search results found in the multi-level hierarchical taxonomy, wherein the selecting favors the semantic mapping of composed n-grams having a greater number of words over the semantic mapping of composed n-grams having fewer words;
identifying a set of filters and valid parameters based, at least in part, on a context in which the natural language query is posed; and
using the set of filters and valid parameters to extract, from the semantic mapping, one or more filter parameters for use in a database query; and
generating a database query, representing the natural language query, based on at least:
the filter parameters and respective filters.

14. The computer implemented system of claim 13, wherein composing the n-grams includes applying a thesaurus to translate at least one word in the query into a semantically equivalent canonical word or phrase representing a semantic mapping and recognized as a value in the multi-level hierarchical taxonomy.

15. The computer implemented system of claim 13, wherein nodes of the multi-level hierarchical taxonomy each include at least one key and one or more canonical word values recognized as associated with the key.

16. The computer implemented system of claim 13, wherein the searching in the multi-level hierarchical taxonomy includes finding one or more nodes of the multi-level hierarchical taxonomy that include the n-grams as canonical word values and assigning the n-grams, including expanded word form n-grams, to term buckets associated with the nodes.

17. The computer implemented system of claim 16, further including, for each particular word in the query, selecting one of the n-grams using the particular word to assign to a particular node and rejecting any other n-grams using the particular word.

18. The computer implemented system of claim 16, wherein each term bucket includes a key value pair, with the value derived from the words in the query and the key derived from a node in the multi-level hierarchical taxonomy.

19. The computer implemented system of claim 16, wherein available filters in the set of filters includes a date criteria.

20. A tangible computer readable storage medium, including program instructions that, when executed on a processor, implement a method of translating a natural language query, the method including:
   processing words in the natural language query through semantic disambiguation and filter parameter extraction, including:
      semantically disambiguating words in the natural language query based on at least:
         composing n-grams of varying lengths from the words in the natural language query;
         searching for the composed n-grams in a multi-level hierarchical taxonomy, and selecting at least one semantic mapping of the composed n-grams from search results found in the multi-level hierarchical taxonomy, wherein the selecting favors the semantic mapping of composed n-grams having a greater number of words over the semantic mapping of composed n-grams having fewer words;
      identifying a set of filters and valid parameters based, at least in part, on a context in which the natural language query is posed; and
      using the set of filters and valid parameters to extract, from the semantic mapping, one or more filter parameters for use in a database query; and
   generating a database query, representing the natural language query, based on at least:
      the filter parameters and respective filters.

21. The tangible computer readable storage medium of claim 20, wherein the searching in the multi-level hierarchical taxonomy includes finding one or more nodes of the multi-level hierarchical taxonomy that include the n-grams as canonical word values and assigning the n-grams, including expanded word form n-grams, to term buckets associated with the nodes.

22. The tangible computer readable storage medium of claim 20, further including, for each particular word in the query, selecting one of the n-grams using the particular word to assign to a particular node and rejecting any other n-grams using the particular word.

23. The tangible computer readable storage medium of claim 21, wherein each term bucket includes a key value pair, with the value derived from the words in the query and the key derived from a node in the multi-level hierarchical taxonomy.

24. The tangible computer readable storage medium of claim 20, further including applying a conjunction rule that combines multiple criteria in the database query, the multiple criteria derived from the words of the query when the natural language query includes "and".

25. The method of claim 1, wherein the searching of the multi-level hierarchical taxonomy finds at least one multi-word composed n-gram.

26. The computer implemented system of claim 13, wherein the searching of the multi-level hierarchical taxonomy finds at least one multi-word composed n-gram.

27. The tangible computer readable storage medium of claim 20, wherein the searching of the multi-level hierarchical taxonomy finds at least one multi-word composed n-gram.

* * * * *